United States Patent
Mandler

(10) Patent No.: US 9,216,486 B2
(45) Date of Patent: Dec. 22, 2015

(54) METHOD AND APPARATUS FOR PROCESSING A PLASTIC PART AND COMPRISING A LATHE SYSTEM

(71) Applicant: Roland Mandler, Heuchelheim (DE)

(72) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 462 days.

(21) Appl. No.: 13/622,042

(22) Filed: Sep. 18, 2012

(65) Prior Publication Data

US 2013/0247726 A1    Sep. 26, 2013

(30) Foreign Application Priority Data

Sep. 20, 2011   (DE) .......................... 10 2011 053 772

(51) Int. Cl.
| | |
|---|---|
| B23B 27/10 | (2006.01) |
| B23Q 11/00 | (2006.01) |
| B23Q 11/10 | (2006.01) |
| B23Q 11/14 | (2006.01) |
| B23B 25/00 | (2006.01) |
| B32B 27/00 | (2006.01) |

(52) U.S. Cl.
CPC ............ B23Q 11/0042 (2013.01); B23B 25/00 (2013.01); B23Q 11/0003 (2013.01); B23Q 11/005 (2013.01); B23Q 11/1007 (2013.01); B23Q 11/145 (2013.01); B23B 2215/40 (2013.01); B23B 2226/61 (2013.01); B23B 2270/30 (2013.01); Y10T 82/10 (2015.01); Y10T 82/2572 (2015.01)

(58) Field of Classification Search
CPC ........................................................ B23B 27/10
USPC .................................................. 82/50; 407/11
See application file for complete search history.

(56) References Cited

U.S. PATENT DOCUMENTS

| | | | | |
|---|---|---|---|---|
| 3,561,299 | A | * | 2/1971 | Brisk et al. ........................... 8/59 |
| 4,095,916 | A | * | 6/1978 | Hammond ..................... 408/1 R |
| 4,825,736 | A | * | 5/1989 | Catanese ........................ 82/1.11 |
| 5,901,623 | A | * | 5/1999 | Hong ................................. 82/50 |
| 6,209,429 | B1 | * | 4/2001 | Urso et al. ..................... 82/1.11 |
| 6,543,319 | B1 | * | 4/2003 | Kress et al. ........................ 82/50 |
| 6,609,446 | B1 | * | 8/2003 | Ohmi et al. ........................ 82/46 |
| 7,641,422 | B2 | * | 1/2010 | Berminge et al. .............. 407/11 |
| 7,856,940 | B2 | * | 12/2010 | Wendler et al. ............... 118/300 |
| 2002/0007706 | A1 | * | 1/2002 | Hattori .............................. 82/50 |
| 2002/0033081 | A1 | * | 3/2002 | Hara .............................. 82/1.11 |
| 2012/0057942 | A1 | * | 3/2012 | Prichard et al. ................. 407/11 |
| 2013/0045059 | A1 | * | 2/2013 | Bozkurt ........................ 409/131 |

FOREIGN PATENT DOCUMENTS

JP            362130149       *  6/1982 ..................... 407/11

* cited by examiner

*Primary Examiner* — Will Fridie, Jr.
(74) *Attorney, Agent, or Firm* — Clark & Brody

(57) ABSTRACT

The invention relates to a method for processing a plastic part by using a lathe system and comprises the following steps:
  rotating the plastic part
  mashing of a tools cutting edge with the plastic part,
  generating a gaseous and a liquid flow,
  whereby the chip, which is lifted of the plastic part, is first surrounded by the gas flow and subsequently by the liquid flow Moreover the invention relates to a lathe system to carry out the said method which comprises a rotatable workpiece receptacle, a tool fitted with a tool cutting edge, and a chip removal device. The chip removal device is fitted with a gas flow generator, having a gas nozzle which points towards the tool and with a liquid flow generator having a liquid channel configured below the tools cutting edge.

12 Claims, 1 Drawing Sheet

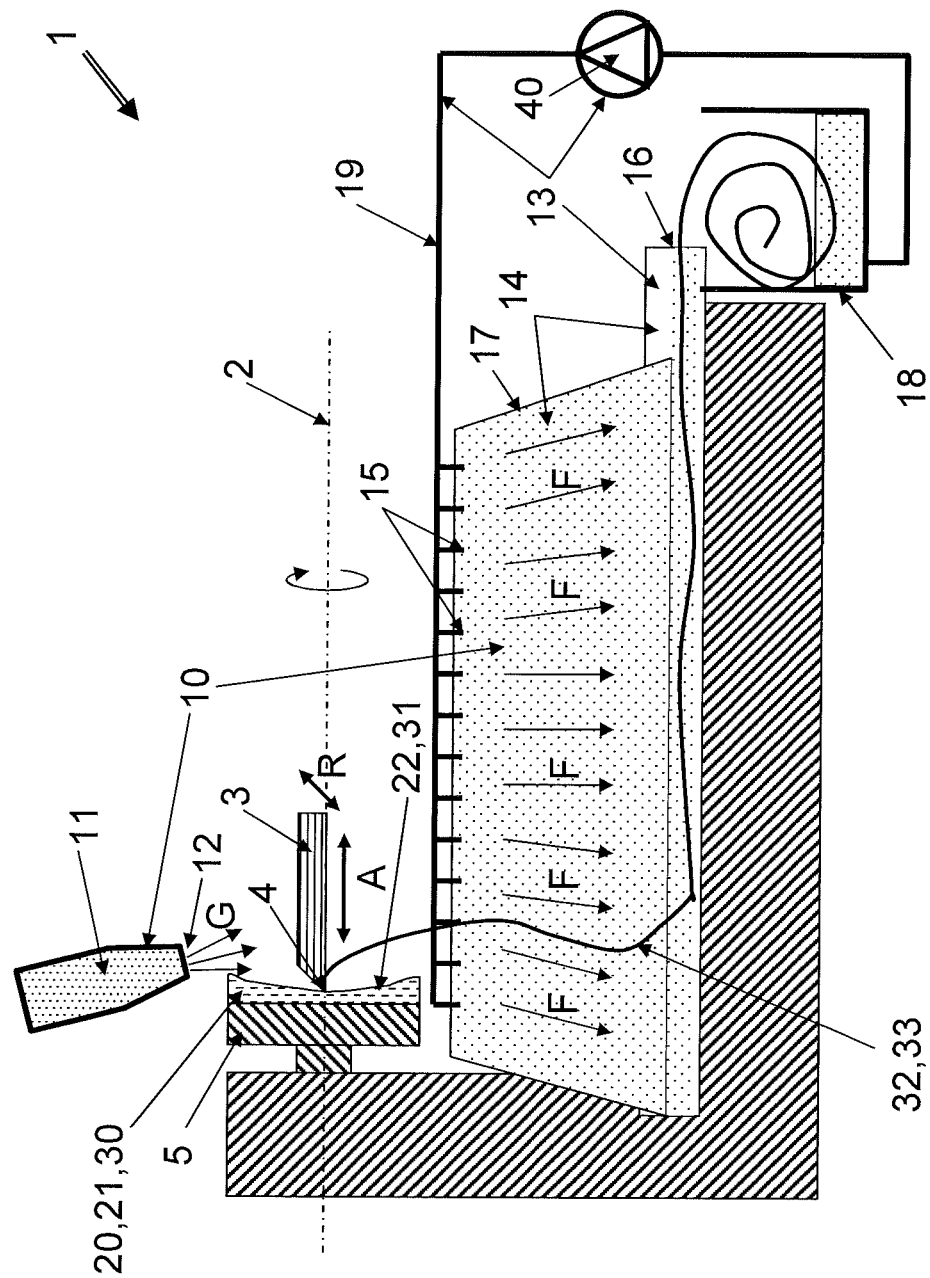

METHOD AND APPARATUS FOR PROCESSING A PLASTIC PART AND COMPRISING A LATHE SYSTEM

FIELD OF THE INVENTION

The present invention concerns a method for processing of a plastic part by using a lathe system as well as a lathe system to implement said method.

BACKGROUND ART

A number of various lathe system to process components/workpieces are known from the state of the art. The meshing of the cutting edge of a tool with a rotating workpiece results in a chip which is lifted of the workpiece surface. Besides processing metal workpieces, processing of plastic parts with a lathe system has become significantly important, especially when manufacturing optical lenses.

The market share of plastic optical lenses made from blanks has increased drastically. In order to optimize different properties of plastic optical lenses, new plastics have been developed in the recent years for optical applications. Especially impact resistant materials are important in this respect. High impact resistance offers good eye protection, illustratively for motor bikers against flying stones or for persons that are exposed to dangerous flying particles for example while working on a workbench.

Particular polycarbonate spectacle lenses have been used for this purpose. This material has a high degree of density and therefore an extremely good impact resistance. When being processed on a lathe such tenacious materials result in non-breaking and therefore very long flowing chips. This feature is advantageous in particular when processing high accuracy optical plastic parts, because chip breaks do not occur, especially not in the immediate vicinity of the cutting zone, that otherwise might entail unevenness on the processed surface.

Preferentially the processing of the surface is performed in a way that only a single flowing chip is generated in each mashing of the cutting edge of the tool with the plastic part or the respective blank. This is especially desired for the final material removal using a diamond lathe to manufacture an optical lens surface of the highest possible quality. Any chip break would result in damages on the lens surface and could not be remediated by the subsequent polishing stage.

Material removal resulting in a mono-flowing chip has the disadvantage that the motion behavior of the very long flowing chip is unpredictable. The long flowing chip might move into rotating lathe components, for instance into a rotating workpiece receptacle wherein it may be tensile stressed until it is been turned off. These tensile loadings may cause irregular material removal in the cutting zone, resulting in irremediable unevenness on the lens surface being processed.

A long flowing chip with a cross-section of about 0.1 by 0.03 mm, winds itself around the turning workpiece receptacle from which it must be subsequently removed by hand. This is resulting in frequent machines stoppages and increased labor costs. If the long flowing chip is not removed by hand, the automated loading of plastic parts has to be stopped because a chip in the area of a collet chuck of said receptacle causes insertion errors.

The state of the art attempts remedying the above disadvantageous by redirecting the chip away from the cutting edge of the tool. Presently water ejecting nozzles are used for that purpose. These ejecting nozzles use comparably high water pressure to deflect the chip, in order to preclude it from being entangled with the workpiece receptacle or with the tool spindle. Other devices are known that redirect the chip by using a vacuum suction device.

Such devices have the disadvantage that a water jet directed to the chip induces oscillations and vibrations in said chip, which negatively effects the chip removal at the cutting side. In particular polycarbonate is susceptible to chip vibrations. In particular the chip skips in and out of the water jet. Consequently this leads to volatile tension loading on the chip and results in an uneven process surface.

Moreover the parts impacted by the water jet start to vibrate. In particular the tool with its cutting edge and the workpiece will vibrate. This leads to nano-defects on the processed surface. These effects can hardly be eliminated by the subsequent polishing. Additionally, the jet of liquid of known devices has a comparatively small cross-section, which allows a flowing chip to move outside this radius of action of the jet of liquid.

While the variant of a vacuum suction does relatively reliable remove the flowing chip, a problem remains because there is no cooling in the cutting zone during cutting. As a result there are undesired increases in temperature which negatively affects the tools cutting quality and the material properties of the process plastic part. Illustratively the plastic part may bear burning marks or may undergo plastic deformations.

Accordingly it is the objective of the present invention to eliminate the disadvantageous of the state of the art and to provide a method to process a plastic part by a lathe system, as well as a lathe system implementing said method, resulting in processed plastic parts having a high surface quality. Particular problems solved by the present invention are the chip removal and the cutting zone cooling. Also, the solution of the present invention shall be highly reliable easily applicable and economical.

SUMMARY OF THE INVENTION

The inventions relates to a method for processing a plastic part by a lathe system comprising the following steps:
Rotating the plastic parts,
Mashing of the cutting edge with the plastic parts,
Generating a gaseous flow and a liquid flow,
Whereby the chip, which is lifted of the plastic part, is firstly circumfluent surrounded by a gaseous flow and subsequently by a liquid flow.

The subsequent surrounding of the chip by the liquid flow has to be understood as that the single chip is not mandatorily immersed only in the gas flow or in the liquid flow. A long chip, in particular a flowing chip or a mono-flow chip can be simultaneously surrounded by the gas flow and the liquid flow, whereby the gas flow and the liquid flow are spaced apart. The spaced separation has to be understood as that the gas flow may surround one segment of the chip and the liquid flow may surround another segment of the chip produced earlier.

Its particular advantageous that the gas flow may feature a relatively conical flow to easily and reliably take up the chip. Within the conical flow the chip may orient itself aerodynamically. In particular it may orient itself parallel to the gas flow and therefore the skipping out of the conical flow is prevented. As a consequence the chip undergoes a relative constant traction by the gas flow. In particular impulsive changes in traction may be prevented. Also, parts surrounded by the gas flow don't vibrate. As a result, unevenness for example nano-defects on the process surface may be prevented.

The gas flow should surround at least the tools cutting edge region in order to remove the chip in a controlled manner early in its formation. This feature also allows cooling of the cutting zone. This gas-cooling is adequate for processing plastic parts with a lathe system, in particular it positively affects the process surface quality.

The subsequent surrounding of the chip by the liquid flow additionally improves the chip removal. Using a flow instead of a jet provides a homogenized sufficient quantity of liquid. If the chip is immersed in the liquid flow, the chip is circumfluently removed by the liquid flow. The chip skips less out of the liquid flow than if a liquid jet would be used. This circumfluent immersion allows homogenously traction on the chip. The traction exerted by the liquid flow prevents the chip from skipping out of the gas flow or its cone of flow respectively. As a consequence the chip is removed from the cutting zone in a uniform manner. Furthermore such a liquid flow does not cause vibrations in the tool the workpiece or other components. All together a very high service quality and a high processing reliability can be attained in this way.

The liquid flow is generated preferably at the bottom of the workspace and it should move constantly and with a large cooling water volume toward the chip output. If the lathe system is closed, the chip should be moved out of the range of spray protection. From there it can be easily removed in the ongoing finishing operation. In an especially preferred embodiment the liquid flow passes at least below the tools cutting edge at an angle of 90+/−5 degrees to the rotation axis of the plastic part or the axis of rotation of the lathe system respectively. Illustratively such a design may be realized by a slanted ramp below the axis of rotation. The axis of rotation should therefore be directed horizontally. As a consequence the ramp restricts the workspace underneath the axis of rotation. The ramp may be a part of the machine bed or be a separate component. The incline of the ramp allows setting the speed of flow and the liquid column of the liquid flow. In such an embodiment the speed of flow should be higher than the rate of the chip formation. This can be realized by a speed of flow higher than the plastic parts speed of rotation multiplied with the product of $2\pi$ and the distance of the tool cutting edge from the axis of rotation. As liquid, plane water or coolants or lubricants can be used.

Additionally, the workpiece may pass the tools cutting edge in the upward direction. That means that the cutting edge should mesh with the workpiece on that side of the workpiece where the tool is moving upwards. As a consequence the generated chip exhibits an arithmetically average downward direction immediately beyond the cutting zone. Due to the support of the gas flow, the chip is prevented from rising and moving beyond a dead point. Instead the chip is guided immediately downward out of the region of the rotating components. The probability of the chip entangling the rotation components and coiling around them is minimized.

Method implementation requires only brief instructions or a predetermined, non-adjustable device. Gas and liquid flow generators are inexpensive compared with the rest of lathe system.

One embodiment of the present invention includes the following step:

blowing the chip by the gas flow towards the liquid flow.

In this embodiment, the gas flow direction should be downward and preferentially towards the liquid flow. As a result, the chip can be guided as fast as possible into the liquid flow. So only a relative short chip segment is situated outside of the liquid flow. Once the liquid flow has gathered the chip, the danger that the chip moves randomly and out of control is widely eliminated.

In an especially preferred embodiment, the method includes the following step:

blowing the chip by means of the gas flow into the liquid flow.

At no time the chip should cross a space between the gas flow and the liquid flow that is outside of the reach of the gas flow. This gas flow should be orientated in a way that it impinges the liquid flow. Furthermore, the chip should not cross a space between the cutting zone and the gas flow that is outside of the reach of the gas flow. Thus the chip is nearly precluded from uncontrolled motions because the chip is always enclosed and guided by one of the flows. As a result a very uniform traction is applied to the chip. Thereby the process surface quality is considerably enhanced.

To reliably control the chip as closely as possible to the cutting zone, an embodiment of the method of invention includes passing the liquid flow below the tools cutting edge. The closer the liquid flow passes by the tools cutting edge, the less intense and smaller the required gas flow can be. Consequently less power needs to be used to generate the gas flow. Additionally the reduced flow speed reduces gas turbulences when the gas flow impinges the tool, the workpiece or the like. Consequently the gas flow remains as laminar as possible. Components in the region of the gas flow are loaded with only minor circumfluent forces and component vibrations are prevented, this results in high surface quality. Also the gas flow causes no disturbing noise.

In principle, the liquid flow should be uniform. In other words, it should be as constant and/or continuous as possible. This applies in particular to the region where the flow surrounds the chip. High uniformity of the liquid flow, at least within the initial region, where the chip first immerses, creates a traction as uniform as possible on the chip. This feature prevents defects on the processed surface.

For the same reasons, the generated gas flow should be laminar. If the gas flow is laminar, the traction on the chip is uniform and high surface quality can be obtained. As a minimum, laminarity should have been reached at the point where the gas flow is generated; however the laminarity may also partly be interfered when a component is reached by the gas flow. During gas flow orientation, care should be paid that a minimum of the processed component are situated within the flow cone. As a result the laminarity is maintained in the subsequent processing progression. The gas flow during chip removal preferentially stationary, in particular prior to its incidence on the chip or the tool. Stationary in this case means, that neither the volume per time nor the speed of the flow are subject changes. In this manner uniform traction on the chip can be achieved.

An especially preferential embodiment of the present invention includes that the flow surrounds the tools cutting edge. This offers two substantial advantageous. First the chip is taken by the gas flow immediately at the cutting zone and as a consequence uncontrolled chip motions are precluded. Secondly the cutting zone is cooled by the gas flow. Each advantage contributes to a high quality of the processed surface. If the cooling by the gas flow may be insufficient under given processing conditions of the plastic, the gas flow can be enriched with a slight amount of coolant and/or lubricant. As a result the gas flow becomes an aerosol flow. The minimal drawbacks caused by a higher volume weight of the gas flow are more than compensated by the positive action of lubrication and/or cooling.

However, in an especially preferential embodiment, the gas flow consists of air. Air is unlimitedly available and does not corrode machine parts. Oxidation of plastic when processed by lathe system is unusual. Accordingly using air is the most economical alternative. If the air is circulated within a sealed work area high air humidity also can improve the cooling in the cutting zone.

The advantages of the present invention become evident especially when the chip is a flowing chip. For especially tough materials, said flowing chip may be a mono-flow chip which ends only if the tools cutting edge no longer meshes with the component. Especially very long chips can be controlled by the method of invention and their entangling with rotating components is prevented.

The invention is especially important for manufacturing plastic optical lenses. The method of the invention is valuable when the plastic part is a blank for a plastic lens and when a blank surface is processed into a lens surface. In particular this method meets with the high requirement for manufacturing optical surfaces. Simultaneously a plurality of lenses may be manufactured automatically without any interruption. With this method mass manufactured products such as spectacle lenses can be produced economically and at a reasonable price. On top of that there is an increase of demand for cameras, loupes and the like which are produced in a light weight manner. High quality optical plastic lenses manufactured by the method of invention may be used in that said products. Especially very tough plastics can be processed by a lathe system using the method of the present invention. Therefore an important implementation of said method relates to processing Polycarbonate parts. Polycarbonate enjoys a large market share as a material for manufacturing spectacle lenses, however—in the state of the art—this material causes considerable problems when processed by a method of the state of the art. These difficulties are eliminated by the uniform in considerable removal of the method of invention.

To minimize the methods energy consumption and to protect the components, the liquid and/or gas flow may be deactivated when the tools cutting edge is disengaged from the plastic part. In that way, short intervals before and after activation can be realized. Illustratively the gas and the liquid flow of an automated CNC machine may be coupled to the different positions.

The present invention moreover relates to a lathe system with which a method of the invention to process a plastic part using such a lathe system can be carried out. This method comprises the following steps:

Rotating the plastic part

Mashing of the tools cutting edge with the plastic part

Generating a gas flow and a liquid flow

Whereby the chip, which is lifted of the plastic part is first circumfluently surrounded by a gas flow and subsequently by a liquid flow, characterized in that, the lathe system comprises a rotatable workpiece receptacle, a tool with a tool cutting edge, and a chip removal device, whereby the chip removal device is equipped with a gas flow generator having a gas nozzle pointing towards the tool with a liquid flow generator having a liquid channel which is positioned below the tools cutting edge.

The lathe system workpiece receptacle may be suitable to receive the plastic part. In that case the work piece receptacle and the plastic part may be jointly rotated around the axis of rotation. Furthermore the lathe system has a tool with a cutting edge suitable to perform the above mentioned method. By adjusting the tool the tools cutting edge can mesh with a rotating plastic part. A particular feature of the lathe system of the invention is its chip removal device. With the gas flow generator a gas flow can be generated which can be emitted trough the gas nozzle. This gas nozzle points in the direction of the tool so that the gas flow rapidly surrounds the lifted chip in the area of the cutting zone. The chip removal device also comprises a liquid flow generator to generate a liquid flow. The liquid channel is situated below the tools cutting edge to allow a chip to move by gravity towards the liquid channel. The liquid channel may be situated at the bottom of the workspace of the lathe system e.g. as a part of the machine bed. The liquid channel should therefore be open upwards. If the chip arrives in the liquid channel the chip can be removed in a constant manner as by a conveying belt. The chip is then subjected to a constant traction.

One embodiment of the lathe system includes that the liquid channel leads to a chip collection bin. This unit makes it possible to collect the chips in a central location to be disposed as waste. The liquid of the liquid flow can be collected and recycled from the chip collecting bin as well. In particular, when the chip collecting bin is equipped with a chip separator, the liquid can circulate. In that case the chip collecting bin can simultaneously act as liquid buffer to compensate any losses illustratively due to evaporation. For that purpose, the chip collection bin or a chip separator can be hydraulically connected to an input side of the liquid flow generator. The liquid flow generator itself can be connected at its output side to the input side of the liquid channel. The output side of the liquid channel then will enter into the chip collection bin.

In an especially preferential embodiment the liquid channel has an incline from one input side to one output side. In this way the liquid flow can be guided into the desired direction and its flow rate and speed may be matched to the production rate of the chip. In particular the flow rate speed should be larger than said chip production rate in order to surround the chip by the flow and to apply traction to the chip. Further, a uniform incline results into a uniform laminar and/or stationary flow, which results in the fact that the traction is also very uniform. Respectively defects on the process surface for example due to sudden changes in the traction on the chip are prevented. Due to the incline an open configuration of the flow channel is possible. Ideally the incline is perpendicular to the axis of rotation of lathe system enhanced to the plastic part.

Alternatively, the incline also may point away from the rotating components. As a result, the incline would be situated on a higher level relative to a plane perpendicular to the axis of rotation on the side of the workpiece receptacle compared to the side pointing to the tools cutting edge. As a consequence the chip would be pulled by the liquid flow away from the rotating components.

The gas nozzle should be positioned on the tools cutting edge side pointing to the workpiece receptacle. In this manner said nozzle is able to blow the chip of the rotating components. However care should be taken that the workpiece receptacle and/or the plastic part are not situated between the gas nozzle and the tools cutting edge. Otherwise it is impossible to achieve a surrounding of the cutting edge by the flow. For that reason the gas nozzle may point 90° from the axis of rotation or even slightly more away from the workpiece receptacle. As a result the tools cutting edge can be surrounded by the flow when dealing with concave processing surfaces. The processing surface then can deflect the gas flow, so that the lifted up chip, is guided away from the rotating components.

To allow blowing the chip downward, the gas nozzle ought to be situated above the tools cutting edge. This configuration is especially advantageous as the chip on account of gravity is anyhow tending to move downward. This motion can be supported by configuring the gas nozzle above the tools cutting edge. In particular the chip is prevented from rising and tipping over a dead point what otherwise would lead to uncontrolled changes in chip direction. Instead, according to the invention, the chip is continuously surrounded by a flow. Therefore the chip is prevented from leaving the conical flow. Accordingly the chip is removed from the cutting zone at a continuous traction.

Moreover the gas nozzle might be mechanically connected to the tool of the lathe system. In such an embodiment the nozzle would be coupled to the tool motions. The gas flow is then able to post cool the tool efficiently, especially when a new plastic part is being inserted. Also the gas nozzle might be adjustable. Positional adjustment illustratively may be attained by using a flexible tube. One further adjustment possibility would be offered if the gas nozzles outlet cross-section is variable. Due to the different adjustment possibilities the method of the invention might be quickly adapted to different manufacturing conditions. For example the method could be adjusted to different surfaces with various chip removal behaviors and various tools cutting edges. A further gas nozzle might also be used. If an additional gas nozzle is used, the gas flow can consist out of partial section. This would allow that the chip is first surrounded by the conical flow in a first section and then by the conical flow of a second section. The sections of the gas flow may be linearly consecutive, or the gas nozzles are arranged in an angle so that the gas flow changes direction. Illustratively the first section might comprise the tools cutting edge and the second section might point away from the rotating components. Accordingly the chip is first removed from the cooled cutting zone and once the chip arrives in a second section, it is guided away from the rotating components.

BRIEF DESCRIPTION OF THE DRAWINGS

Further characteristics, details and advantages of the invention results from the text of the claims as well as from the following description of an embodiment related to the FIGURE.

FIG. 1 shows a lathe system implanting the method of invention.

DETAILED DESCRIPTION OF THE INVENTION

FIG. 1 shows a lathe system 1 comprising a rotatable workpiece receptacle 5, a tool 3 fitted with a tool cutting edge 4 and a chip removal device 10. Said chip removal device comprises a gas flow generator 11 fitted with a gas nozzle 12 pointing in the direction of the tool 3 and a liquid flow generator 13 fitted with a liquid channel 14 configured underneath the tools cutting edge 4.

The liquid channel 14 issues into a chip collection bin 18. Said channel also is fitted with an incline 17 in the form of a ramp running from the input side 15 to the output side 16. The ramp is positioned in an angle of 90° to the axis of rotation 2 of the lathe system 1. To feed the liquid channel 14 with liquid F, the liquid flow generator 13 is equipped with a pump 40 which is inserted into a liquid conduit 19. This liquid conduit 19 is connected at its input side to the chip collecting bin 18 and issues at its output side through a plurality of openings into the input side 15 of the liquid channel 14. From there the liquid F flows uniformly, in particular laminary, down the ramp and lastly through a collection channel which is running transversely to the ramp at the output side 16 of the liquid channel 14.

The gas nozzle 12 is configured minimally on the side of the tools cutting edge for pointing toward the workpiece receptacle 5. From this position, a flow cone of a gas flow G is still able to surround the tools cutting edge 4. Said conical flow guides the chip 32 directly behind the cutting zone of the tools cutting edge 4 away from the workpiece receptacle 5. Additionally the gas nozzle 12 is configured above the tools cutting edge 4 and is pointing downward. In this manner the generated gas flow G surrounds the tools cutting edge 4 and finally impinges the liquid flow F in the liquid channel 14.

The workpiece receptacle supports a plastic part 30. Said plastic part can particular be a blank 20 of which a front surface 31 is being processed by the tools cutting edge 4. By an axially adjusting movement R parallel to the axis of rotation 2, the tools cutting edge 4 can mesh with the blank 20 and a chip 32 is lifted of the plastic part. The distance of the tools cutting edge 4 to the axis of rotation 2 can be varied by a radially adjusting movement R. In this process a lens surface 22 of a plastically lens 21 is produced.

The invention furthermore includes that the blank 20 is guided to pass by the tools cutting edge 4 from below upwards. For that purpose, the tools cutting edge 4 meshes with the blank 20 on that side of the blank 20 on which the blank 20 carries out a rotational upward movement. Immediately beyond the cutting zone, the generated chip 32 therefore has an arithmetically averaged downward movement direction. Due to the gas flow G, rising and dipping of the chip 32 beyond a dead point is prevented, especially when the chip 32 is a flowing chip 33. The chip 32 is in contrast to that immediately guided downwards out of the range of the rotating components. In this manner the probability of the chip 32 entangling the rotating components and winding around them is minimized.

The lathe system 1 henceforth allows carrying out a method comprising the following steps:
Rotating the plastic part 30,
Mashing of the tools cutting edge 4 with the plastic part 30,
Generating a gas flow G and a liquid flow F,
Surrounding of the chip 32, which is lifted from the plastic part 30, first by the gas flow G and subsequently by the liquid flow F.?

In particular, the chip 32 is blown by the gas flow G towards the liquid flow F, whereby the chip 32 does not pass through any flow free space between the gas flow G and the liquid flow F. Accordingly the chip 32 is blown directly by the gas flow G into the liquid flow F. For that purpose the liquid flow F is guided beneath the tools cutting edge 4. The incline 17 of the ramp subtended for that purpose results in its uniform liquid flow F.

Furthermore the generated gas flow is laminar, consists of air and surrounds the tools cutting edge 4. As it is shown, a flowing chip 33 is generated during the processing with a lathe system. The flowing chip extends from the cutting zone of the tools cutting edge 4 to the chip collection bin 18. The method of invention allows material removal with a mono-flow chip and is therefore enables a defect free lens surface 22 production. Subsequently the lens surface 22 can easily be polished. This method is especially advantageous when processing polycarbonate plastic parts.

The present invention is not restricted to any of the above discussed embodiments but rather can be modified in a versatile manner.

All of the characteristics and advantages originating from the claims, description and figures including constructive details, special arrangements and processing steps, are suitable for being essential to the invention, both in themselves and in the most different combinations.

LIST OF REFERENCES.

| | |
|---|---|
| 1 | lathe system |
| 2 | axis of rotation |
| 3 | tool |
| 4 | tools cutting edge |
| 5 | workpiece receptacle |
| 10 | chip removal device |
| 11 | gas flow generator |
| 12 | gas nozzle |
| 13 | liquid flow generator |
| 14 | liquid channel |
| 15 | input side |
| 16 | output side |
| 17 | incline |
| 18 | chip collecting bin |
| 19 | liquid conduit |
| 20 | blank |
| 21 | plastic lens |
| 22 | lens surface |
| 30 | plastic part |
| 31 | front surface |
| 32 | chip |
| 33 | flowing chip |
| 40 | pump |
| A | axially adjusting movement |
| F | liquid |
| G | gas flow |
| R | radially adjusting movements |

The invention claimed is:

1. A method for processing a plastic part (30) using a lathe system (1), comprising the following steps:
 a) rotating the plastic part (30);
 b) machining of the plastic part (30) with a tool cutting edge (4);
 further characterized by the following steps:
 d) providing a liquid flow (F), a surface of the liquid flow facing the tool cutting edge (4), and a gas flow (G), the tool cutting edge positioned between the gas flow (G) and liquid flow (F);
 e) whereby a chip (32), which is lifted off of the plastic part, is a flowing chip (33);
 f) blowing the chip (32) by means of the gas flow (G) into the liquid flow (F) such that the chip (32) is first surrounded by the gas flow (G) and subsequently by the liquid flow (F).

2. The method as claimed in claim 1, characterized by the following step:
 g) blowing the chip (32) by means of the gas flow (G) toward the liquid flow (F).

3. The method as claimed in claim 1, characterized in that the liquid flow (F) is uniform.

4. The method as claimed in claim 1, characterized in that the gas flow (G) is laminar.

5. The method as claimed in claim 1, characterized by the following step:
 h) surrounding of the tool cutting edge (4) by the gas flow (G).

6. The method as claimed in claim 1, characterized in that the gas in the gas flow (G) is air.

7. The method as claimed in claim 1, characterized in that the plastic part (30) is a blank (20) for a plastic lens (21), and comprises the following step:
 i) processing a surface (31) of a blank (20) into a lens surface (22).

8. The method as claimed in claim 1, characterized in that the plastic part (30) is made of a polycarbonate.

9. A lathe system (1) to carry out a method claimed in claim 1, comprising a workpiece receptacle (5), a tool (3) fitted with a tool cutting edge (4) and a chip removal device (10), wherein the chip removal device (10) comprises a gas flow generator (11) fitted with a gas nozzle (12) pointing toward the tool (3) and further comprising a liquid flow generator (13) fitted with a liquid channel, the tool cutting edge (4) positioned between the gas nozzle and the liquid channel of the liquid flow generator (13), a surface of the liquid channel facing the tool cutting edge.

10. The lathe system (1) as claimed in claim 9, characterized in that the liquid channel (14) issues into a chip collecting bin (18).

11. The lathe system (1) as claimed in claim 9, characterized in that the liquid channel (14) comprises an incline (17) running from an input side (15) to an output side (16).

12. The lathe system (1) as claimed in claim 9, characterized in that the gas nozzle (12) is configured on the side of the tool cutting edge (4) which is pointing to the workpiece receptacle (5).

* * * * *